(12) United States Patent
O

(10) Patent No.: US 9,085,649 B2
(45) Date of Patent: Jul. 21, 2015

(54) AQUEOUS SOLID DIACYL PEROXIDE SUSPENSION

(75) Inventor: Boen Ho O, Utrecht (NL)

(73) Assignee: AKZO NOBEL CHEMICALS INTERNATIONAL B.V., Amersfoort (NL)

(*) Notice: Subject to any disclaimer, the term of this patent is extended or adjusted under 35 U.S.C. 154(b) by 556 days.

(21) Appl. No.: 13/259,878

(22) PCT Filed: Mar. 31, 2010

(86) PCT No.: PCT/EP2010/054261
§ 371 (c)(1),
(2), (4) Date: Sep. 23, 2011

(87) PCT Pub. No.: WO2010/112534
PCT Pub. Date: Oct. 7, 2010

(65) Prior Publication Data
US 2012/0010352 A1 Jan. 12, 2012

Related U.S. Application Data

(60) Provisional application No. 61/169,010, filed on Apr. 14, 2009.

(30) Foreign Application Priority Data

Apr. 3, 2009 (EP) .................. 09157292

(51) Int. Cl.
C08F 2/20 (2006.01)
C08F 2/18 (2006.01)
C08L 31/04 (2006.01)
C08F 4/34 (2006.01)

(52) U.S. Cl.
CPC ........................ C08F 4/34 (2013.01)

(58) Field of Classification Search
USPC ............... 524/548, 563; 526/232.1, 225, 201; 252/363.5
See application file for complete search history.

(56) References Cited

U.S. PATENT DOCUMENTS

| 4,552,682 A | 11/1985 | Black et al. |
| 4,734,135 A | 3/1988 | Satomi et al. |
| 5,270,271 A | 12/1993 | Lundin et al. |

FOREIGN PATENT DOCUMENTS

| EP | 0 263 619 A2 | 4/1988 | |
| EP | 0 492 712 A1 * | 7/1992 | ............... C08F 2/20 |
| EP | 1 826 236 A1 | 8/2007 | |
| FR | 2 851 245 A1 | 8/2004 | |
| JP | 04-318002 A | 11/1992 | |
| JP | 05-178921 A | 7/1993 | |
| JP | 07-330715 A | 12/1995 | |
| RU | 2 205 840 C2 | 6/2003 | |
| WO | 96/27586 A1 | 9/1996 | |
| WO | WO 2004/089999 A2 | 10/2004 | |

OTHER PUBLICATIONS

European Search Report for Application No. 09 15 7292 dated Sep. 9, 2009.
Patent Abstracts of Japan of JP 07-330715 A (publication date Dec. 19, 1995).
ACD 10910 P1-JP Office Action for Japanese Application No. 2012-502654 dated Jun. 18, 2013.
ACD 10910 P1-JP Office Action English language machine translation for Japanese Application No. 2012-502654 dated Jun. 18, 2013.
ACD 10910 P1-JP Office Action for Japanese Application No. 2012-502654 dated Nov. 12, 2013.
ACD 10910 P1-JP Office Action English language machine translation for Japanese Application No. 2012-502654 dated Nov. 12, 2013.
"Benzoyl Peroxide Introduced for Acne and Pet Formulations," press article (internet) on the sale of the product CurOxyl 42 BP-USP, C&T.com E-Newsletter, published Feb. 28, 2007.
Notice of Opposition issued in corresponding European Application No. 010712412.5 dated Dec. 2, 2014, and English translation of the same (27 pages).

* cited by examiner

*Primary Examiner* — Robert Harlan
(74) *Attorney, Agent, or Firm* — Alice C. Su

(57) ABSTRACT

Aqueous suspension comprising 35-45 wt % of solid diacyl peroxide particles having a d50 in the range 1-10 microns, 0.05-1 wt % of a dispersant, and not more than 1 wt % of an organic solvent. This concentrated peroxide suspension comprises only a minor amount of dispersant, has a low volatile organic content and is nonetheless stable for months and low in viscosity.

16 Claims, No Drawings

AQUEOUS SOLID DIACYL PEROXIDE SUSPENSION

REFERENCE TO RELATED APPLICATION(S)

This application is the U.S. National Phase of PCT/EP2010/054261 filed on Mar. 31, 2010, and claims the benefit of U.S. Provisional Application No. 61/169,010, filed on Apr. 14, 2009.

The present invention relates to an aqueous diacyl peroxide suspension and its use in the production of high polymers, i.e. polymers with a molecular weight higher than 1000 g/mol, in particular of (expandable) polystyrene.

Solid diacyl peroxides are known to be suitable initiators in the production of high polymers. In particular dibenzoyl peroxide (BPO) is known to be suitable as an initiator in the polymerization of styrenics, such as the emulsion polymerization of styrene to form (expandable) polystyrene. This process is performed in aqueous suspension and the initiator is added as aqueous suspension to the reaction mixture. An example of such a styrene polymerization process is the one disclosed in WO 2004/089999, in which the initiator is dosed to the reaction mixture over a period of time—preferably, at least 0.5 hour, more preferably 1.0 hour—in a continuous or semi-continuous fashion.

For this process, the use of a pourable fluid of a finely suspended peroxide, i.e. a peroxide suspension having a viscosity not more than 800 mPa.s and particles smaller than 10 microns, is essential in order to dose peroxide to the reactor in a suitable way. A higher viscosity will require powerful pumps and may cause plugging in the transport pipes. Coarser particles enhance abrasion and clogging of valves.

However, low viscosity suspensions generally consist of coarse particles and have a high inhomogeneity, i.e. phase separation. For dosing accuracy, however, the absence of any inhomogeneity is essential. Therefore, to be able to operate in the market, i.e. to cover the time period required for transport, buffer storage, and handling, peroxide suspensions are not allowed to have any inhomogeneity for at least two months. In other words, the suspensions' shelf life time—defined as the time period absent of phase separation—must be at least two months.

In order to provide relatively stable low viscosity suspensions, dispersants are generally added to the suspensions in concentrations of several wt %. Unfortunately, dispersants tend to negatively affect the stability of the (expandable) polystyrene suspensions that are formed during styrene polymerisation and they also disadvantageously affect the size of the polystyrene particles that are formed. The amount of dispersant in BPO suspensions used for (expandable) polystyrene production therefore needs to be as low as possible.

EP 0 263 619 recognizes this problem and disclosed BPO suspensions comprising a crystalline cellulose in addition to a small amount of dispersant. However, the highly concentrated BPO suspensions (i.e. containing more than 35 wt % BPO) disclosed in the document have a too high viscosity, contain an organic solvent (ethylene glycol), and/or have a insufficient shelf-life of much less than two months.

JP-A 07-330 715 discloses 40 wt % aqueous BPO suspensions low in dispersant and low in viscosity. The shelf-life of these suspensions, however, is too low for practical use. As shown in the Examples below, a foamy suspension is obtained with coarse particles, which shows separation after a few days.

The object of the present invention is to provide an aqueous suspension comprising 35-45 wt % of a solid diacyl peroxide, said suspension comprising only a minor amount of dispersant (not more than 1 wt %), has a low volatile organic content (VOC), is nonetheless stable for months and low in viscosity.

This object is achieved by the present invention, which relates to an aqueous suspension comprising:
- 35-45 wt % of solid diacyl peroxide particles having a d50 particle size in the range 1-10 microns,
- 0.05-1 wt % of a dispersant, and
- not more than 1 wt % of an organic solvent.

The aqueous suspension according to the present invention comprises 35-45 wt %, preferably 38-42 wt % of solid diacyl peroxide particles. The diacyl peroxide particles have a d50 in the range 1-10 microns, which means that 50 vol % of the total amount of peroxide particles in the suspension have a particle size in the range 1-10 microns (µm). Preferably, the d50 is in the range of 1-7 microns, more preferably in the range 2-6 microns. The d50 determined by applying a Malvern Mastersizer, which utilizes a static light scattering technique. The particle size distribution as expressed by the ratio of d90/d50 is preferably smaller than 6, more preferably smaller than 5, and most preferably smaller than 4.

Examples of suitable solid diacyl peroxides are dibenzoyl peroxide (BPO) and didecanoyl peroxide. Most preferably, the solid diacyl peroxide is a dibenzoyl peroxide, which includes substituted dibenzoyl peroxides such as dichlorobenzoyl peroxide. Most preferably, the diacyl peroxide is unsubstituted dibenzoyl peroxide, i.e. Ph-C(O)—O—C(O)-Ph, also referred to as BPO.

The suspension according to the present invention comprises 0.05-1 wt %, preferably 0.07-0.8 wt %, and most preferably 0.1-0.6 wt % of a dispersant. Lower amounts result in unstable suspensions; higher amounts are undesirable in view of the negative effect the dispersant may have in polymerisation reactions and other applications, the enhancement of the suspension's COD (chemical oxygen demand), as well as for economic reasons.

Suitable dispersants include all adsorbing polymeric and non-polymeric dispersants, ionic and non-ionic dispersants, and their mixtures. The dispersant is preferably water-soluble or water-dispersible. Water-insoluble dispersants are less preferred, because they are difficult to handle. The dispersant is preferably one of the ingredients that are used in the process in which the peroxide suspension is to be applied. More preferably, the dispersant is an ingredient applied in the polymerization of styrenics or their mixtures. Most preferably, the dispersant is selected from the group consisting of fully or partly hydrolyzed polyvinyl acetates and their copolymers (e.g. fully or partly hydrolyzed ethylene vinyl acetate copolymers), polyvinylpyrrolidone, alkyl or aryl sulfonates, alkyl or aryl benzenesulfonates (e.g. sodium benzene sulfonate), alkyl or aryl sulphates, and mixtures thereof.

The suspension according to the present invention does not contain more than 1 wt % of an organic solvent. Preferably, it contains less than 0.5 wt %, more preferably less then 0.1 wt %, and most preferably no organic solvent. Examples of solvents that are usually present in aqueous peroxide suspensions are polar organic solvents such as ethylene glycol, glycerol, and lower alcohols and their ethers, such as polyethylene glycol, and non-polar organic solvents such as esters (e.g. trimethyl phosphate, dibutyl maleate, or diisodecyl adipate), ethers, hydrocarbons, and their derivatives.

The volatile organic content (VOC) of the suspension according to the present invention is preferably not higher than 15 g/l, more preferably not higher than 10 g/l, and most preferably not higher than 6 g/l. The VOC refers to the concentration of all compounds having an initial boiling point less than or equal to 250° C., measured at a standard atmospheric pressure of 101.3 kPa.

In addition to water, solid diacyl peroxide, and dispersant, the aqueous suspension according to the present invention may contain small amounts of additives, such as thickeners or anti-settling agents and pH buffers.

Anti-settling agents are compounds that are able to delay or retard the process of settling within the suspension. Both organic and inorganic anti-settling agents are suitable. Suitable organic anti-settling agents are generally polymeric in nature. Examples of suitable polymeric anti-settling agents are homo-, co-, and terpolymers of carboxylic acids, functionalized cellulose, such as cellulose ethers and esters, carboxymethyl cellulose, functionalized carboxymethyl cellulose, xanthan gum, guar gum, locus bean gum, gellan gum, pectin, carragenan, gum agar, polyacrylates, polymethacrylates, functionalized polystyrene (SMA polymers), alpha methyl styrene polymaleic acids, functionalized EHEC, and functionalized and/or halogenated polyolefins. Suitable inorganic anti-settling agents are solids forming spatial structures, such as plate-like structures or needle-like structures. Examples of suitable inorganic anti-settling agents are bentonite, hectorite, silica, kaolinite, montmorillonite, and attapulgite.

Preferably, the anti-settling agent causes the suspension fluid becomes shear thinning. More preferably, the anti-settling agent causes thixotropy in the fluid. Most preferably, the anti-settling agent causes the fluid to show a yield point.

Anti-settling agents are preferably present in the aqueous suspension according to the present invention in an amount of 0-1 wt %, more preferably 0.1-0.8 wt %, and most preferably 0.2-0.6 wt %.

Examples of suitable pH buffers are sodium acetate, calcium oxide, magnesium oxide, calcium carbonate, and sodium bicarbonate. pH buffers are preferably present in the aqueous suspension according to the present invention in an amount of 0-0.5 wt %, more preferably 0-0.4 wt %, and most preferably 0.1-0.3 wt %.

The viscosity of the aqueous suspension according to the present invention is preferably below 800 mPa.s, more preferably below 600 mPa.s, and most preferably below 400 mPa.s, as determined by an Erichsen Disc Viscometer type 332/1, range 0-1500 mPa.s at 22±3° C.

The stability of the suspension according to the present invention is defined in terms of shelf-life time, i.e. the time elapsing between the preparation of the suspension and the initial traces of phase separation (also called incipient separation), which expresses itself by creaming of water or settling of peroxide. The separation is determined visually and with help of a probe. The shelf-life time is preferably at least 2 months, more preferably at least 2.5 months, and most preferably at least 3 months.

Additionally, the suspension may also contain sequestering agents, fillers, etc. However, this is not recommended, because these materials may change the properties of the suspension. Further, the suspension preferably does not contain a polyphosphoric alkali metal salt.

The aqueous suspension according to the present invention can be prepared by milling a mixture of the diacyl peroxide powder, water, dispersant, and optional other components in a conventional milling or high shear dispersing device. Examples of such devices are rotor/stator units such as an Ultra Turrax®, colloid mills, pearl mills, ball mills, dispax, ultrasonic mills, etc.

The aqueous suspension according to the present invention can be used for all processes wherein aqueous diacyl peroxide suspensions can be used. This includes various polymerization reactions, such as suspension polymerizations. This includes the suspension polymerization of styrene to form (expandable) polystyrene, of vinyl acetate to form poly(vinyl acetate), of (meth)acrylic monomers to form poly(meth)acrylates, and of mixtures of two or more (unsaturated) monomers to form copolymers.

The suspension according to the present invention is especially suitable for processes in a BPO suspension is to be dosed in a continuous or semi-continuous manner.

EXAMPLES

Shelf-life Measurements 400 g of suspension was dosed to a 500 ml PE-bottle with a diameter of 7.5 cm and stored at room temperature (21-23° C.). On daily basis, the suspension was visually examined for phase separation, i.e. the formation of an upper layer of water and a bottom layer of peroxide, using a probe. The shelf life time is the time that elapses between the moment of preparation of the suspension and the moment of observing the initial traces of separation, i.e. incipient separation.

Viscosity

An Erichsen Disc Viscometer type 332/1 was applied (range 0-1500 mPa.s). A suspension (200 g) was dosed to a tin cup (7.3 cm in diameter and 7.5 cm in height). The Erichsen disc was immersed in the suspension up to the proper measuring depth, thereby preventing "swinging" of the cup. A first reading was done directly after immersing and a second reading wad performed after one minute of mixing.

BPO Particle Size Determination

The BPO particle size was determined using a Master Sizer type S, including a dispersing unit type QSpec.

Comparative Example 1

Example 5 of JP-A 07-330 715 was re-worked as follows: BPO (Perkadox® L W75, 75% active, supplied by Akzo Nobel) was mixed following the description provided in said patent application with diethylhexylsulfosuccinate, Rhodigel 80 as the polysaccharide, a 24% solution of NaOH in demineralised (demi) water, and demi water in the amounts mentioned in said patent application. Following the description of this prior art example, the mixture was simply stirred; not milled. The mixture obtained after 20 minutes of stirring contained a lot of air: the density dropped below 0.8 kg/l and only 389g fitted in de 500 ml PE container. The resulting suspension contained BPO particles with a d50 of about 180 microns. The shelf life was less than 4 days.

Examples 2-5

40 wt % aqueous BPO suspensions according to the invention were prepared by mixing all ingredients with help of an Ultra Turrax and subsequently milling this mixture with a beat mill. Before measuring the viscosity, the suspensions were deaerated.

The following ingredients were used:
Gohsenol® KP08: partly saponified polyvinylacetate supplied by Nippon Gohsei
Luvitec® K30: low viscous polyvinylpyrrolidon supplied by Basf
Luvitec® K90: high viscous polyvinylpyrrolidon supplied by Basf
Nacconol® 90G: sodium salt of dodecylbezenesulfonate supplied by Stepan
Rhodigel® 80: xanthan gum supplied by Grindsted
BPO: Perkadox® L W75, 75% active, supplied by Akzo Nobel NaAc.3H$_2$O: sodium acetate trihydrate supplied by JT Baker The suspensions' composition and their viscosities and shelf-life times are listed in Table 1. The results show that stable suspensions of low viscosity can be obtained using less than 1 wt % of dispersant.

TABLE 1

| ingredient (w/w %) | Ex. 2 | Ex. 3 | Ex. 4 | Ex. 5 |
|---|---|---|---|---|
| BPO | 40 | 40 | 40 | 40 |
| Gohsenol KP08 | 0.5 | | | |
| Luvitec K30 solution, calc. as pure | | 0.08 | | |
| Luvitec K90 | | | 0.2 | |
| Nacconol 90G | | | | 0.3 |
| Thickener: Rhodigel 80 | 0.5 | 0.4 | 0.4 | 0.4 |
| pH-buffer: NaAc•3H$_2$O | 0.3 | | | 0.3 |
| d50 (μm) | 3.6 | 3.6 | –/– | 3.8 |
| d90/d50 | 2.6 | 2.7 | –/– | 3.5 |
| Viscosity (mPa · s) | 50-50 | 60-60 | –/– | 30-30 |
| pourability | yes | yes | yes | yes |
| Shelf-life (months) | –/– | >2 | –/– | >2.5 |

Comparative Example 6

A 40 wt % aqueous suspension of di-tertbutylcyclohexyl peroxydicarbonate (Perkadox® 16, ex-AkzoNobel) containing 1.5±0.4% of dispersant (nonylphenol ethoxylate (5)) and balance water was prepared.

The peroxide particles had a d50 of about 6 microns.

Shelf-life measurements showed that at least 1.0 wt % of dispersant was required to obtain a shelf-life of at least 2 months. This shows that not all solid peroxides can be formulated in aqueous suspension with less than 1 wt % dispersant.

The invention claimed is:

1. An aqueous suspension comprising:
   35-45 wt % of solid diacyl peroxide particles having a d50 particle size in the range 1-10 microns,
   0.05-0.8 wt % of a dispersant, and
   not more than 1 wt % of an organic solvent,
   wherein the solid diacyl peroxide is a substituted or unsubstituted dibenzoyl peroxide; and
   wherein the dispersant is selected from the group consisting of fully or partly hydrolyzed polyvinyl acetates and their copolymers, polyvinylpyrrolidone, alkyl or aryl sulfonates, alkyl or aryl benzenesulfonates, alkyl or sulphates, and mixtures thereof.

2. The aqueous suspension according to claim 1 consisting of 35-45 wt % of solid diacyl peroxide particles having a d50 particle size in the range 1-10 microns, 0.05-0.8 wt % of a dispersant, 0-1 wt % of an organic solvent, 0-1 wt % of an anti-settling agent, 0-0.5 wt % of a pH buffer, and balance of water.

3. The aqueous suspension according to claim 1, wherein the aqueous suspension has a viscosity of 800 mPa·s or less, measured at 22±3° C.

4. The aqueous suspension according to claim 1, wherein the aqueous suspension has a shelf-life time of at least two months.

5. The aqueous suspension according to claim 1, wherein the aqueous suspension has a volatile organic content (VOC) of 15 g/l or less.

6. A process for the production of a high polymer, the process comprising dosing the aqueous suspension according to claim 1 to a reactor.

7. The process according to claim 6 wherein the high polymer is polystyrene.

8. The aqueous suspension according to claim 2, wherein the aqueous suspension has a viscosity of 800 mPa·s or less, measured at 22±3° C.

9. The aqueous suspension according to claim 2, wherein the aqueous suspension has a shelf-life time of at least two months.

10. The aqueous suspension according to claim 3, wherein the aqueous suspension has a shelf-life time of at least two months.

11. The aqueous suspension according to claim 2, wherein the aqueous suspension has a volatile organic content (VOC) of 15 g/l or less.

12. The aqueous suspension according to claim 3, wherein the aqueous suspension has a volatile organic content (VOC) of 15 g/l or less.

13. The aqueous suspension according to claim 4, wherein the aqueous suspension has a volatile organic content (VOC) of 15 g/l or less.

14. The aqueous suspension according to claim 1, wherein the dispersant is present in an amount in the range from 0.07 to 0.8 wt %.

15. A process for the production of a high polymer, the process comprising dosing the aqueous suspension according to claim 14 to a reactor.

16. The process according to claim 15 wherein the high polymer is polystyrene.

* * * * *